(12) United States Patent
Lloyd et al.

(10) Patent No.: US 9,665,860 B2
(45) Date of Patent: May 30, 2017

(54) SOFTWARE APPLICATION FRAMEWORK FOR NETWORK-CONNECTED DEVICES

(75) Inventors: David B. Lloyd, Cambridge (GB); Eric Bilange, San Diego, CA (US)

(73) Assignee: Shoreline Innovations, LLC, Los Altos, CA (US)

(*) Notice: Subject to any disclaimer, the term of this patent is extended or adjusted under 35 U.S.C. 154(b) by 1382 days.

(21) Appl. No.: 12/628,405

(22) Filed: Dec. 1, 2009

(65) Prior Publication Data

US 2010/0076871 A1   Mar. 25, 2010

Related U.S. Application Data

(62) Division of application No. 10/638,262, filed on Aug. 8, 2003.

(60) Provisional application No. 60/402,310, filed on Aug. 8, 2002.

(51) Int. Cl.

| | |
|---|---|
| *G06Q 20/12* | (2012.01) |
| *G06F 9/445* | (2006.01) |
| *G06F 21/12* | (2013.01) |
| *G06Q 30/04* | (2012.01) |
| *G06Q 30/06* | (2012.01) |
| *H04L 29/08* | (2006.01) |
| *H04W 4/00* | (2009.01) |

(52) U.S. Cl.
CPC ........... *G06Q 20/1235* (2013.01); *G06F 8/61* (2013.01); *G06F 21/121* (2013.01); *G06Q 30/04* (2013.01); *G06Q 30/0601* (2013.01); *G06Q 30/0645* (2013.01); *H04L 67/34* (2013.01); *H04W 4/001* (2013.01)

(58) Field of Classification Search
CPC ........................................ G06C 30/06
USPC ............................................. 705/59
See application file for complete search history.

(56) References Cited

U.S. PATENT DOCUMENTS

| | | | | |
|---|---|---|---|---|
| 4,888,798 | A | 12/1989 | Earnest | |
| 5,634,080 | A * | 5/1997 | Kikinis | G06F 1/1626 345/156 |
| 6,018,627 | A | 1/2000 | Iyengar et al. | |
| 6,484,182 | B1 | 11/2002 | Dunphy et al. | |
| 6,948,070 | B1 | 9/2005 | Ginter et al. | |
| 6,966,832 | B2 * | 11/2005 | Leen | G07F 17/32 463/16 |

(Continued)

OTHER PUBLICATIONS

Bainbridge et al., 2001 "CICS and Enterprise JavaBeans," IBM Systems Journal 40, pp. 46-67.

(Continued)

*Primary Examiner* — Calvin L Hewitt, II
*Assistant Examiner* — Cristina Sherr

(57) ABSTRACT

A facility for provisioning and managing registered applications is described. Registered applications can be downloaded to a mobile device from an application provisioning server. When the download is complete, the mobile device may begin execution of the registered application. However, at least portions of the registered application cannot be executed by the mobile device without first passing control to an application provisioning server via a network connection. Upon receiving temporary control of the registered application, the application provisioning server can perform tasks such as license verification and other tasks before turning control of the application back to the mobile device.

19 Claims, 7 Drawing Sheets

(56) References Cited

U.S. PATENT DOCUMENTS

| | | | | |
|---|---|---|---|---|
| 7,209,900 | B2* | 4/2007 | Hunter | G06Q 20/1235 |
| | | | | 348/E7.063 |
| 7,587,502 | B2 | 9/2009 | Crawford et al. | |
| 7,711,586 | B2 | 5/2010 | Aggarwal et al. | |
| 2002/0069263 | A1* | 6/2002 | Sears | G06F 9/445 |
| | | | | 709/218 |
| 2002/0183045 | A1* | 12/2002 | Emmerson | H04L 63/08 |
| | | | | 455/412.1 |
| 2003/0059022 | A1* | 3/2003 | Nebiker | H04L 12/58 |
| | | | | 379/219 |
| 2003/0084165 | A1* | 5/2003 | Kjellberg | H04L 63/08 |
| | | | | 709/227 |
| 2003/0208763 | A1* | 11/2003 | McElhatten | G06F 3/0482 |
| | | | | 725/58 |
| 2004/0122774 | A1* | 6/2004 | Studd | G06Q 20/32 |
| | | | | 705/65 |
| 2005/0021995 | A1 | 1/2005 | Lal et al. | |
| 2006/0073820 | A1* | 4/2006 | Craswell | G06F 8/65 |
| | | | | 455/419 |

OTHER PUBLICATIONS

Blau et al., 2004, "Nokia Ups Enterprise Appeal," InfoWorld 26, p. 19.

Carroll, 2001, "Can Java bridge the wireless data divide?," Telephony 240, p. 49.

Costello, 2001, "Nextel, Motorola intro Java phone," InfoWorld 23, p. 75B.

Dillenberger et al., 2000, "Building a Java virtual machine for server applications: The Jvm on OS/390," IBM Systems Journal 39, pp. 194-210.

Essick, 1998, "Ericsson to enhance W-CDMA phones with Java," InfoWorld 20, p. 54.

Gladwin, 2001, "Sun spotlights wireless," Computerworld 35, p. 10.

Gottschalk, 1998, "Technical overview of IBM's Java initiatives," IBM Systems Journal 37, pp. 308-322.

Hall, 2003, "Sun Disputes Claim That Java Handhelds . . . ," Computerworld 37, p. 6.

Hamann et al., 2001, "Securing e-business applications using smart cards," IBM Systems Journal 40, pp. 635-647.

Koved et al, 2001, "Security challenges for Enterprise Java in an e-business environment," IBM Systems Journal 40, pp. 130-152.

Kreger, 2001, "Java Management Extensions for application management," IBM Systems Journal 40, pp. 104-129.

Schwartz, 2000, "Micro Java to spill onto cell phones," InfoWorld 22, p. 10.

Williams, 2001, "NTT DoCoMo launches first cell phones to support Java," InfoWorld 23, p. 42A-42B.

USPTO, Non-final Office action dated Sep. 4, 2008 for U.S. Appl. No. 10/638,262.

USTPO, Final Office action dated May 18, 2009 for U.S. Appl. No. 10/638,262.

* cited by examiner

SOFTWARE APPLICATION FRAMEWORK FOR NETWORK-CONNECTED DEVICES

CROSS-REFERENCE TO RELATED APPLICATION

This application claims priority to U.S. Provisional Application No. 60/402,310, filed Aug. 8, 2002, herein incorporated in its entirety by reference. This application is a divisional of U.S. patent application Ser. No. 10/638,262, filed Aug. 8, 2003.

TECHNICAL FIELD

The present invention is directed to the field of software applications and, more particularly, to the field of provisioning and managing software applications.

BACKGROUND

As the demand for wireless network-connected devices and services continues to grow, the consumer market is continually flooded with new classes of handheld and compact devices such as smart cellular telephones, pagers PDAs (personal digital assistants), etc. To meet demands for services and software applications relating to these and similar devices, various technologies including WAP (Wireless Application Protocol) and Java 2 Platform Micro Edition ("J2ME") have been developed to facilitate the creation and implementation of software applications that run on such devices.

With some of these technologies, applications may be stored locally on a device so that they may be executed when the user is outside an area where network coverage is provided. However, applications stored locally on handheld devices are sometimes limited by the compact nature of the devices. For example, handheld devices have limited user interfaces, such as small screens and condensed keyboards. Additionally, handheld and compact devices may be limited to very small amounts of memory (a few hundred kilobytes).

Because handheld and compact devices are typically too small to program defensively, applications for such devices are often tightly tailored to a specific device, particularly regarding screen size or localization language. This is especially true with "platform independent" technologies like J2ME, which facilitate "write-once run-anywhere" applications that typically require more memory resources than other types of applications.

Because of such limitations, technologies like J2ME are generally streamlined and do not typically provide any restrictions on how applications are moved between supplier and device. For example, J2ME does not provide a mechanism to restrict an application to running on a single device, based on the identity of that device. Nor is there any restriction preventing copying of applications from a first device to another device once the application is initially downloaded onto the first device. Some handsets, for example, allow applications to be beamed between handsets and copied from a handset onto a PC and from there distributed to further devices. As a result, once downloaded onto a device, applications and other content can be further copied between devices, leading to a loss of revenues for application developers.

It would be desirable to provide a secure, cost-effective and scaleable facility through which content can be distributed to users in a manner that allows for prevention of piracy, integration with existing systems, reduced risk to network and device integrity, minimal inconvenience to the user and flexibility in licensing.

DETAILED DESCRIPTION

I. Introduction

Figure 1:
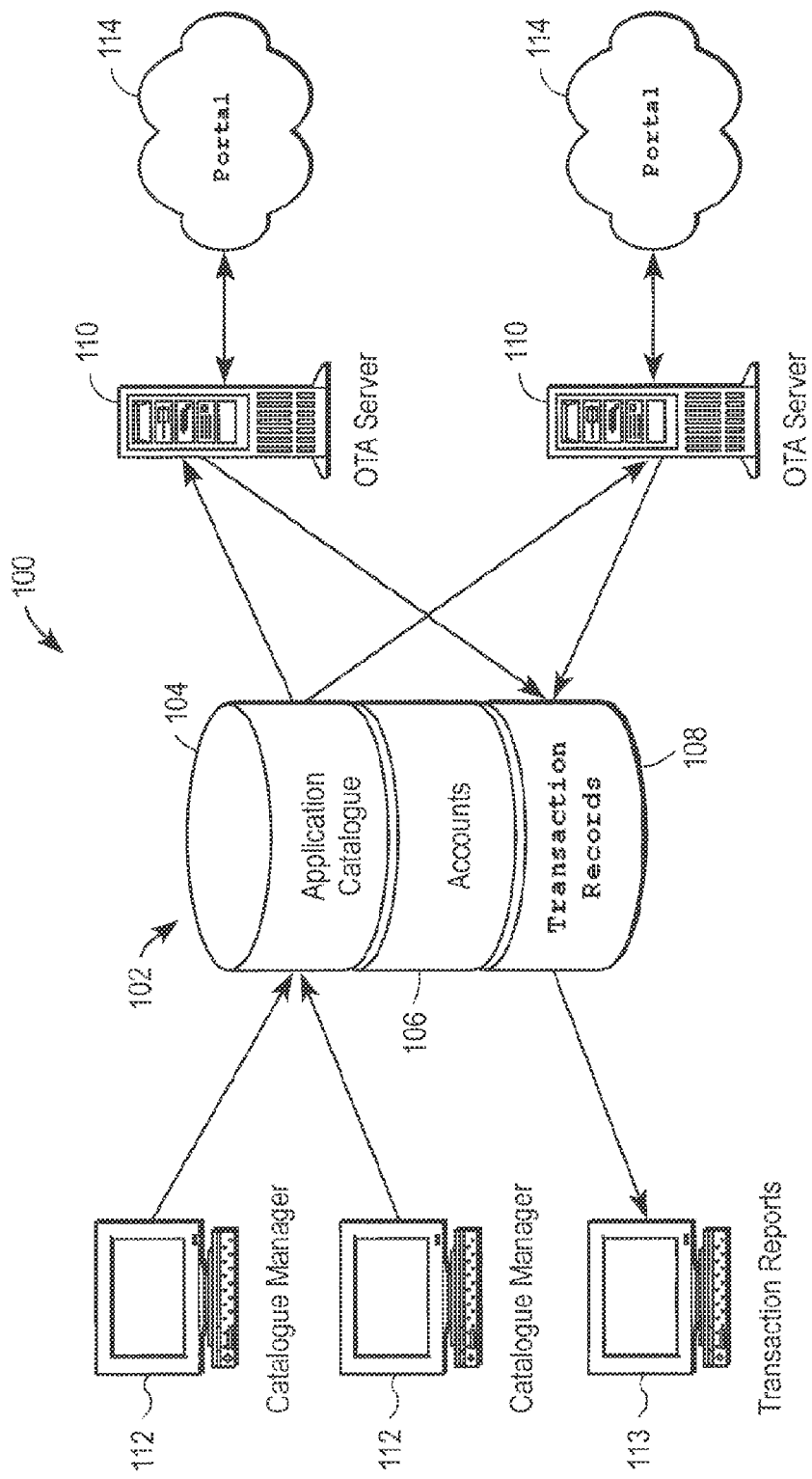
FIGS. 1 and 2 illustrate an example of a system for provisioning and maintaining applications that utilize a registered application framework.

A facility for supporting and securing applications running on mobile devices, handheld devices and similar devices (referred to herein as "mobile devices" or "devices") is provided. In some embodiments, a set of high-level computer instructions that would typically be implemented using a standard application framework and class library is implemented using a modified application framework and classes that allow server to provide licensing and application management services. An application modified in this way is herein referred to as a registered application.

For example, a registered application can be implemented in a J2ME environment, where the top-level application is called a MIDlet. MIDlets are analogous to Applets used in web browsers, and are named after the Mobile Information Device Profile (MIDP). The MIDlet is the root of all MIDP applications and can be started, paused and stopped by the Java Application Manager on the device. The typical application "skeleton" or class shell for a standard MIDlet includes a StartApp( ) method that corresponds with a hierarchy of MIDlet-related class files. In some embodiments based on a J2ME environment, the standard MIDlet shell is updated so that a RegisteredStart( ) method and corresponding MIDlet-related class library files replace the standard StartApp( ) method and corresponding Registered-MIDlet-related class library files.

This modified design allows an application provisioning server (e.g., an "over the air" or "OTA" server) to take control and perform tasks such as license verification, digital rights management, etc. before passing control back to the registered application running on a device. The registered application framework can be used to support developers across a range of available handsets and other devices and can insulate developers from various carrier or service provider requirements.

By passing control to the application provisioning server, in some embodiments, the registered application can be used to prevent unwanted copying of the application from device to device. For example, a license key can be downloaded onto a handset on which the registered application is initially installed. When the registered application is first run from the handset, the application provisioning server can then verify the license key. The use of the registered application in this way prevents a copy from being executed without the license key, as the license key is configured so that it is not copied when the application is copied from one device to another.

The registered application may support a variety of licensing arrangements. For example, a software application license can be tagged with an expiration date or a limited number of uses. In addition, many variations of server-based charging policies may be applied, including rental, rental subscription, limited free trial, coin-op, feature charging, etc. With many of these charging models, if an application user's license expires, the application may refer back to the license server for a new license, at which point a further charge to the user's account can be made, subject to the user's approval.

Besides facilitating licensing and prevention of copying, the registered application may facilitate the generation and monitoring of other types of billing events associated with a user's account (e.g., "feature charging"). For example, a user may be charged for "cheat codes" or "hints" associated with an electronic game. In addition, the registered application may allow for sending user data such as high scores to the provisioning server and optionally, to charge for such services according to a policy set by the provisioning server. For example, a user of a game application may be able to post his/her high score to a central leader board seen by all other players—either downloaded back onto the mobile device or viewable from the mobile device's WAP browser or a web browser.

Web retail models have demonstrated the value of incorporating user feedback into a catalogue used to display lists of applications available to users. In some embodiments, the registered application allows the user to provide such feedback. For example, a user may rate an application after it is purchased. This rating may be posted to a server and used to generate popularity statistics. Applications can then be presented in application catalogue menus in order of popularity, increasing the likelihood of user satisfaction with a download, as user ratings are a more precise measure than the number of downloads.

The registered application may also provide various services to developers. For example, developers may initially design applications using a single scaled-down version of the registered application, creating a general version of the registered application. Later, the facility can substitute a specific version of the registered application appropriate for a specific user's particular mobile device and/or service without having to involve the developer in this stage.

Additionally, the registered application may allow for easy upgrades of already-installed registered applications, allowing application developers to continue to improve their applications, even after they have been distributed in the consumer market. A server may keep track of which versions of registered applications individual users have downloaded allowing updates to be deployed to them. Registered applications may automatically check for updates. Many options are available for billing or charging users for updates. For example, updates that fix problems may be made freely available while new improved versions might incur an upgrade fee.

As well as eliminating a cycle of updates with developers, the registered application may also provide some other standardization such as elements of the application's user interface (e.g., how to present error states or game intro sequences).

Figure 2:
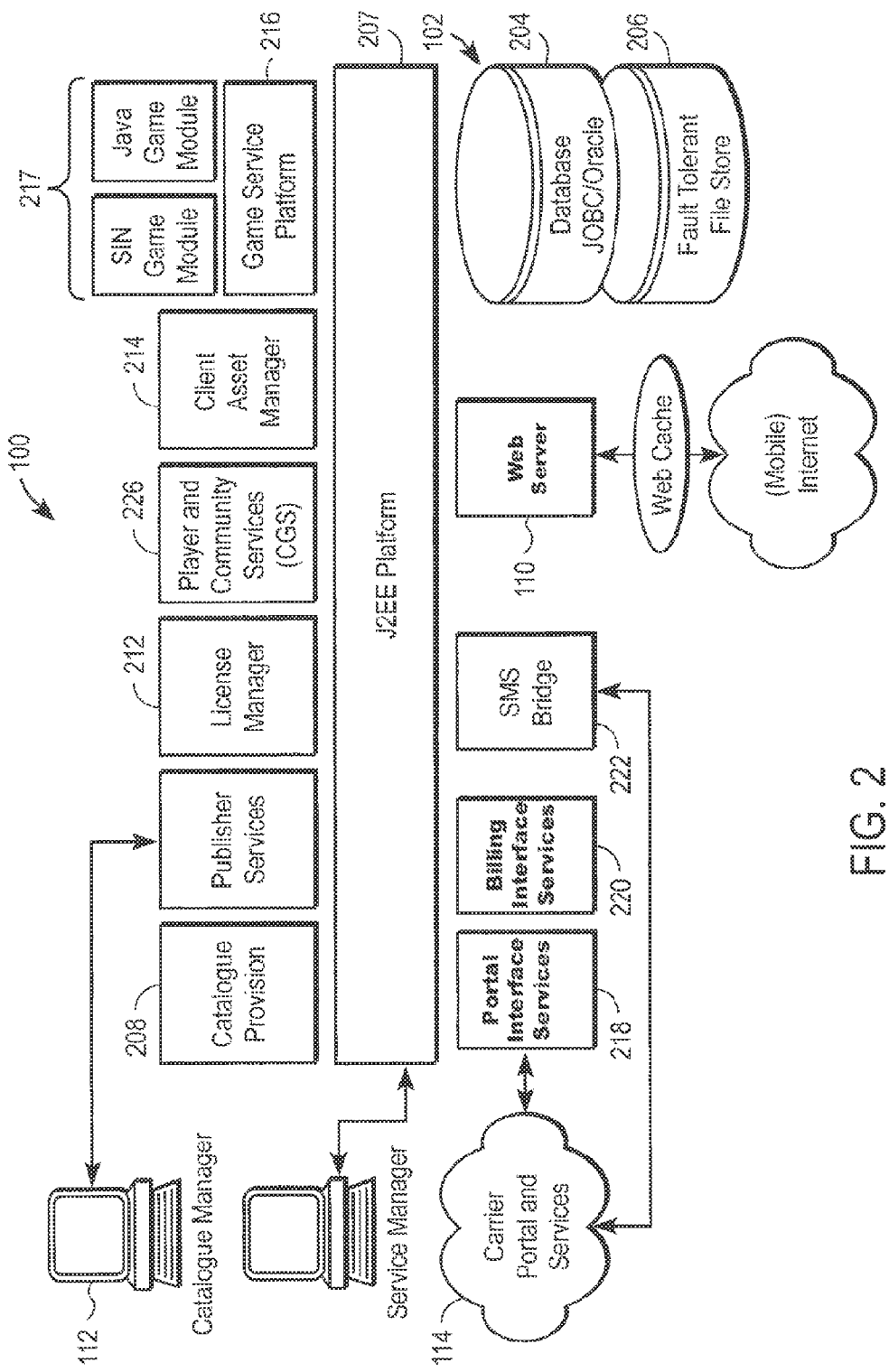

II. System Architecture for Provisioning and Maintaining Registered Applications FIGS. 1 and 2 illustrate an example of a system 100 for provisioning and maintaining applications that utilize a registered application framework. The system may be, for example, a carrier system or an application provisioning service system. This system may revolve around a central database 102 that holds an application catalogue 104, user and supplier accounts 106 and transaction records 108. The central database 102 may also include supplemental data and a J2EE application server (not shown) to support controllers, business logic and presentation layers (not shown). As shown in FIG. 2, the central database 102 may be implemented with a commercial-grade database 204 (e.g., Oracle 9i) as the server for secure concurrent access, high reliability and scalability. For additional reliability, the database may reside on a Fault-Tolerant Filestore 206 (managed RAID array). Database access may be via container-managed persistence (CMP) (not shown) as part of the larger J2EE platform 207.

A catalogue provision module 208 may be implemented using JSP (JavaServerPages), Servlets and a CMP business logic layer (not shown) to reduce load on the central database 102. The JSP pages may be WML, HTML or other format (e.g., proprietary format, etc.).

One or more application provisioning servers 110 (e.g., "over-the-air" or "OTA servers") can connect to the application catalogue. The use of multiple OTA servers 110 allows for distributing or serving different territories or portals.

The OTA servers 110 may provide a secure framework for defining user billing mechanisms, authenticating and recording user purchases and storing and forwarding charging records. Charges to users may be recorded with the user identity and a reason code for the charge. The OTA servers may integrate with a wide variety of external billing mechanisms using protocols such as IPDR or SOAP.

The application catalogue 104 drives the one or more OTA servers 110 and provides raw information from which user menus and application brochures may be constructed and presented appropriately for varying types of mobile device (not shown). The application catalogue 104 may be managed from remote workstations (not shown) via a secure connection to the database with one or more catalogue managers 112, an easy-to-use tool that may be provided as part of the system. The use of multiple catalogue managers 112 allows different departments to administer the application catalogue 104 concurrently. The catalogue manager 112 may be supplied as a J2EE client application that can be run on a content manager's desktop remotely from the server 110 running the central database. The catalogue manager 112 may provide a simple visual tool for maintenance of the application catalogue 104 and may be configured as a complete end-to-end solution to manage the workflow of content from developer to live provisioning service.

Using a transaction reports component 113, the system may allow for easy accounting of application usage to suppliers and calculation of revenues to be paid via a mechanism for generating transaction reports showing statistics against applications and suppliers in a variety of different views.

The OTA servers 110 use the information stored in the central database 102 to generate views on the application catalogue 104 as requested by a portal 114. Each OTA server 110 may be implemented using connected game server technology to handle portal and billing integration providing user identification—it can also act in place of a portal 114 where there is none. On a lower level, each OTA server 110 may be implemented in Java as a set of Enterprise components (Java Server Pagers, Servlets and Enterprise Java Beans) for deployment on a J2EE platform such as Oracle 9i or BEA Weblogic.

Other components in the system include a license manager 212 that provides support for digital rights management including copy protection and advanced charging models and a client asset manager 214 that allows client applications to have additional assets residing on the server (such as extra game levels) that can be charged for. In addition, a game service platform 216 provides a home for a server component of multiplayer and client/server games. A customizable portal interface services component 218 maintains responsibility for interfacing with, for example, a carrier's portal 114, providing services such as user-registration, links back to the carrier's portal etc. A billing interface services component 220 is responsible for interfacing with, for example, a carrier's billing system. These interface components (218 and 220) may be configured to handle a wide range of protocols and to be easily customizable. An SMS bridge component 224 allows short message service ("SMS") messages to be sent and received by the server. It supports most protocols used by SMSCs.

The system architecture offers various possibilities for integration and interoperability with carrier components and components from other vendors. For example, users may be allowed to browse the application catalogue 104 for applications suitable for their mobile device and, having made their selection, authorize payment via credit card and initiate download. In some embodiments, the system may be designed so that it is tightly integrated with already-existing billing and user registration systems, for example, carrier billing systems.

The facility may include the ability to identify the user and associate him/her with a billing account. For example, a connected game server 226 ("CGS") that provides user identification along with portal and billing system integration services may be implemented to facilitate charging the user for downloading a registered application.

Provisioning of registered applications to mobile devices (not shown) may be facilitated through the use of a web-site to download registered applications. The registered applications may be discovered through the mobile device's WAP browser (not shown), provided that the registered applications are compatible with the user's specific mobile device.

Many mobile devices conform to J2ME guidelines and recommended practices for user-initiated OTA provisioning and MIDP provisioning in the WAP environment and use the WAP browser to initiate download. But older Java mobile devices such as the Motorola Accompli 008 or iDen family, may use a custom protocol to describe OTA provisioning of Java applications without involving the WAP browser.

III. Developing Registered Applications

Implementation of the registered application begins at the time that the application is initially developed. A developer tool may provide a programmer/developer with a standardized delivery target and access to extensive high-value technical information, which can be customized for a carrier or portal partner. This allows developers to focus on content creation, rather than resolving technical differences between multiple mobile devices types and carrier systems.

The following is an example of implementation of a registered application for configured for MIDP. In a conventional MIDP application, the following skeleton is typically used:

```
import javax.microedition.midlet.*;
public class MyApplication extends MIDlet
{
    public MyApplication ( )
    {
        // Any initial setup
    }
    public void startApp ( )
    {
        // This is the real start for the application invoked by the Application Manager
    }
}
```

A registered MIDP application may have a similar skeleton, with modifications shown in bold:

```
import javax.microedition.midlet.*;
import ngame.midlet.*;
public class MyApplication extends RegisteredMIDlet
{
    public MyApplication ( )
    {
        appName = "My Application";
        // Any initial setup
    }
    public void startRegisteredApp ( )
    {
        // This is the real start for the application once the license has been verified
    }
}
```

In this example, a standard MIDlet is converted to a registered MIDlet by (1) importing a package containing classes relating to the registered MIDlet; (2) changing the parent class from "MIDlet" to "RegisteredMIDlet;" (3) adding appName="..."; to the application constructor to help with identification of the registered application at the OTA server; and (4) changing the method startApp( ) to startRegisteredApp( ). The class RegisteredMIDlet is derived from MIDlet and has an implementation of the method startApp( ) that first performs any digital rights management checks or other tasks before invoking the method startRegisteredApp( ) shown in the skeleton above. The startRegisteredApp( ) method is then defined by any subclasses of RegisteredMIDlet. According to this modified skeleton, the developer builds a subclass of RegisteredMIDlet (not MIDlet) and provides an implementation of startRegisteredApp( ) instead of startApp( ).

To simplify the initial implementation of applications that utilize the registered application framework, developers may use a single scaled-down version of the registered application so that they can create a general version of the application. Later, the facility can substitute a specific version of the registered application appropriate for a specific user's particular mobile device and/or service without having to involve the developer in this stage. For example, if the user's device does not allow for copying from one device to another, then the facility can install a lightweight version of the registered application that simply checks for expiration of any rental period. Alternatively, if a mobile device freely allows copies, then the facility may install a version of the registered application that binds to the hardware identification (e.g., IMEI) of the mobile device. To best provide effective client support, different versions of the registered application may allow for custom interfacing to the implemented provisioning technique.

In some embodiments, once an application has been developed as a registered application, it can not be executed without at least initial network access to a license manager. To prevent inconvenience during development and testing, in some embodiments, the license verification mechanism can be disabled for debugging purposes by including the following declaration in the constructor:

verifyLicence=false;\

IV. Provisioning Registered Applications

Figure 3:
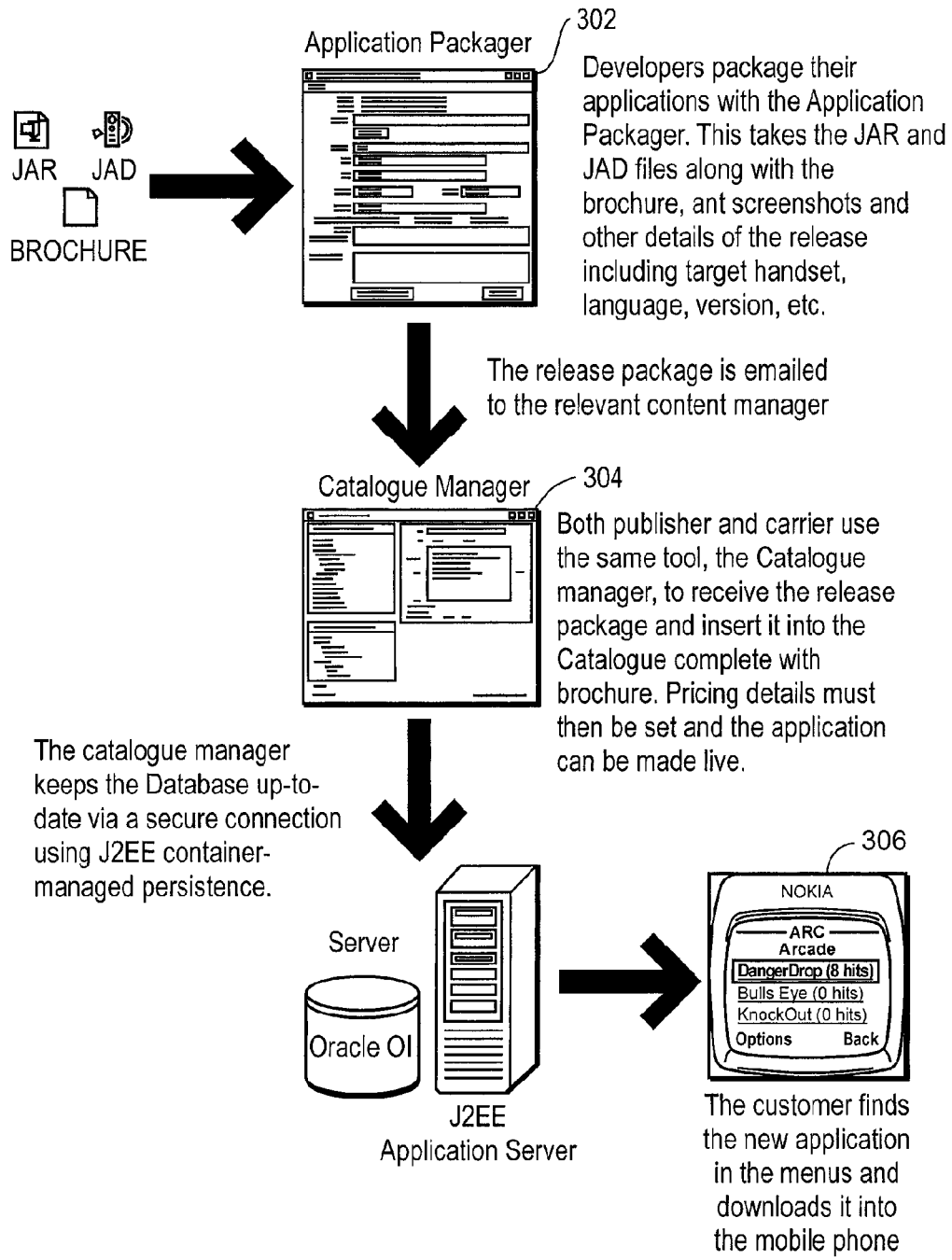
FIG. 3 is a flow diagram showing an example of a provisioning preparation process in one embodiment.

Once an application is developed using the registered application framework, the application may be prepared for download. FIG. 3 is a flow diagram showing an example of a provisioning preparation process in one embodiment. In block 302, the registered application is bound within an application package prior to download. The application package may contain, for example, JAR and JAD files, along with a brochure, screenshots, and other information about the application (e.g., target mobile device, language, version, etc.). In the case where the developer/programmer uses a scaled-down version of the registered application during development, binding the registered application in a JAR file may involve packaging the application with a more robust version of the registered application that corresponds to, for example, a carrier's infrastructure (e.g., which application provisioning server and digital rights management the carrier is using). In the case of an MIDP application, this may involve replacing the registered MIDlet class file in the application JAR. In addition, a unique version of the registered application may be available for each of the mobile devices being supported by a particular carrier. In this way, the application package may be deployed with the correct registered application without the distributor having to go through a cycle with the developer. In some embodiments, the application provisioning server could bind the correct registered application with the JAR file "on the fly."

Once the appropriate registered application is bound to the application package, the application package may then be available for download, as shown in block 304. To facilitate download, the application package may be emailed to a content manager or other administrator, who uses a tool such as the catalogue manager 112 of FIGS. 1 and 2 to receive the application package and insert it into the application catalogue. Pricing details may also be set at this time. A customer can then select the application package for download (block 306).

Figure 4:
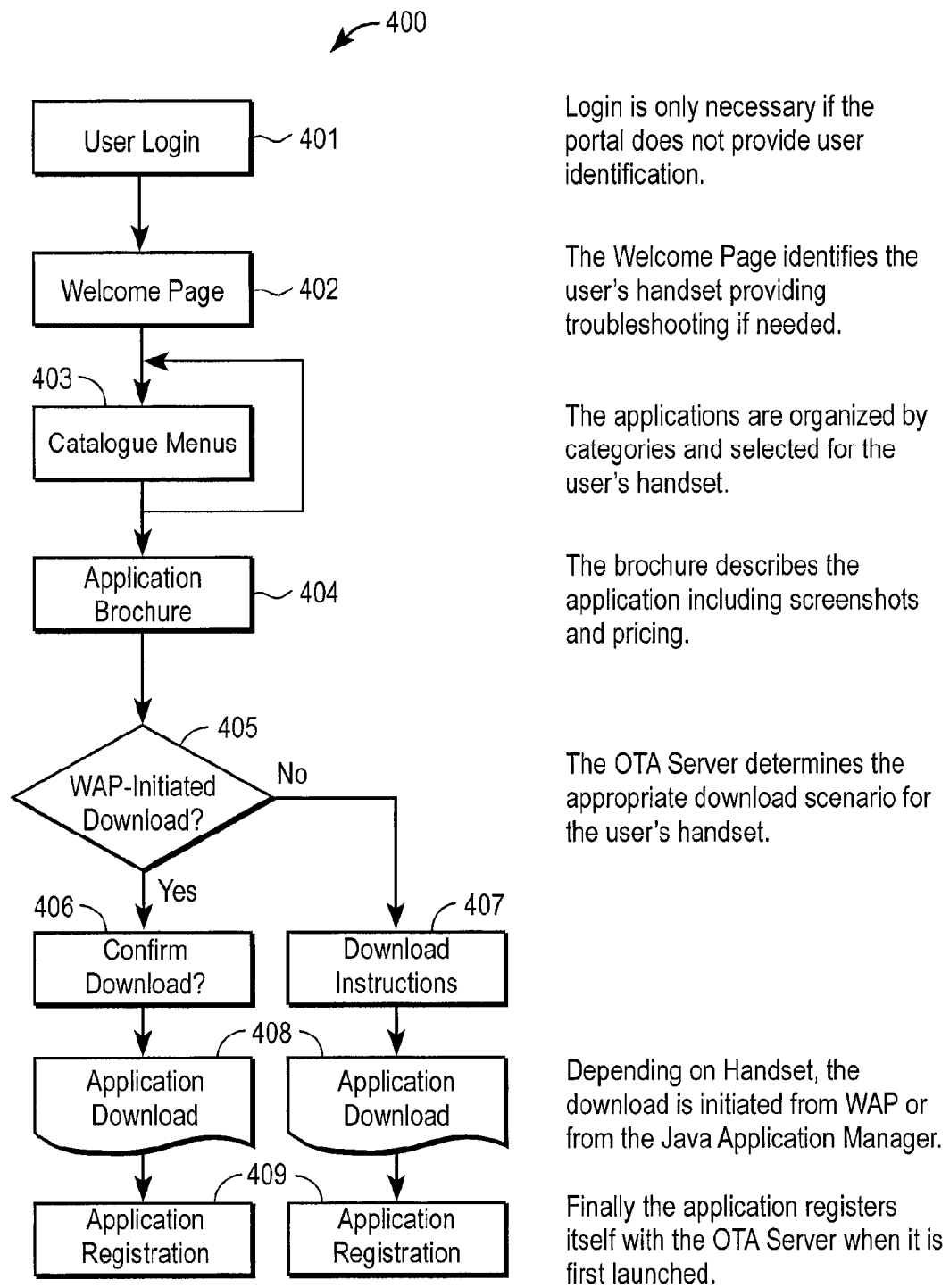
FIG. 4 is a flow chart showing an example of a download process in one embodiment.

FIG. 4 is a flow chart showing an example of an application download process in some embodiments. In optional block 401, if the portal does not provide for user identification, the user logs in to the application provisioning server (e.g., OTA server) from the mobile device. In block 402, the facility identifies the user's mobile device and may provide troubleshooting if needed. In block 403, applications compatible with the user's mobile device are presented to the user, organized by categories. In block 404, the user is presented with an application brochure for a selected application. In decision block 405, the application provisioning server determines the appropriate download scenario for the user's mobile device. The application provisioning server can choose a suitable user identification, download and licensing strategy to use for provisioning applications based on many different factors, such as method of download initiation (e.g., download initiated via WAP, proprietary mechanism, etc.); ability of mobile device to allow for copying of applications; and ability of mobile device to be uniquely identified from within the J2ME environment. For those applications that use the registered application framework, the licensing step may be delayed until the first launch of the application on the mobile device when the application has been downloaded onto the mobile device completely and successfully (block 409 below).

In the illustrated example, if the mobile device is WAP-compatible, the routine continues at block 406 where the user confirms download. Otherwise, the routine continues at block 407, where alternative download instructions are provided. After block 406 or 407 the routine continues at block 408 where the application is downloaded. Depending on the mobile device type, as determined in block 405, the download may be initiated from WAP, the Java application manager, or some other source.

The routine ends after optional block 409, where the application provisioning server takes control of the registered application on first launch to get an unlock code that will be stored on the mobile device for subsequent launches. The unlock code may be provided to the device when the application is initially downloaded. Because the unlock code cannot be copied from one mobile device to another, this prevents the execution of unauthorized copies of the registered application and is done as an additional security measure against piracy. For example, in the case of a registered MIDP application, when a user starts the registered application on the mobile device, the Java Application Manager loads the application and the application provisioning server takes control to perform any validation (e.g., digital rights management checks, etc.) that may be defined by various subclasses of RegisteredMIDlet. The application does not receive back control until the registered MIDlet has completed its validation. This technique may also be used to provide the expiration policy for the license.

Reporting mechanisms may be used to prevent charging users in the case of failed downloads. For example, the MIDP Appendices describe a mechanism for the Java Application Manager to report successful downloads. Such a mechanism may be supported by the facility for most mobile devices. The facility may also support other tactics such as allowing the user to download the application repeatedly within a limited time frame.

Figure 5:
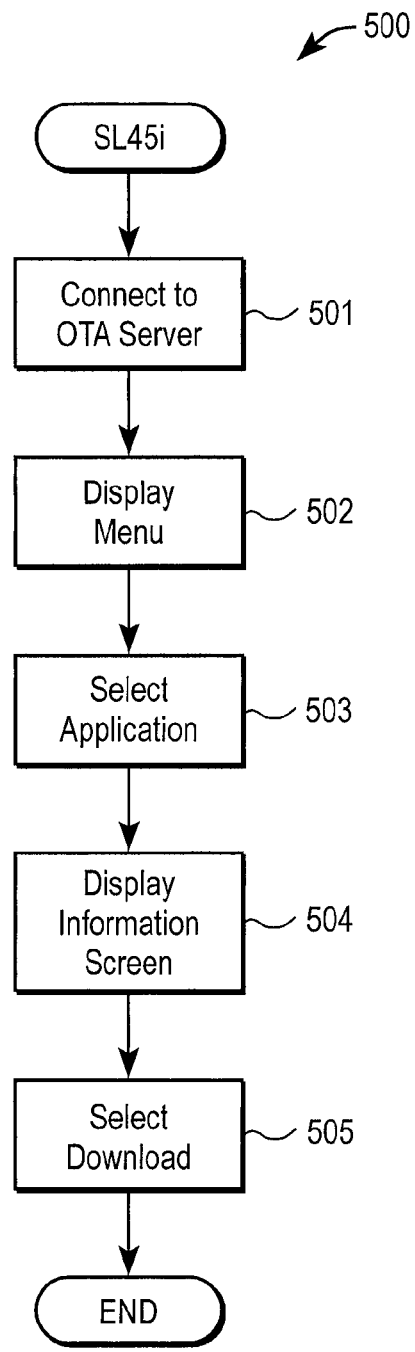
FIG. 5 is a flow diagram illustrating the download of a registered Java application onto a specific device, the Siemens SL45I.

FIG. 5 is a flow diagram illustrating a routine 500, for download of a registered Java application onto a specific device, the Siemens SL45I. The SL45i handset is a more recent Java handset and is likely to be typical of the coming generation of devices. It conforms to Appendix A and Appendix B of the MIDP-1.0 specification and uses the WAP browser as the initiating agent for OTA download.

The JAR files to be downloaded are stored on a fault-tolerant file store rather than in the database. They are thus referenced by static URLs allowing server caches such as SQUID to migrate the data to the network fringe closest to the points of access for the user's download connections.

In block 501, the device starts the Internet and either enters the OTA URL or finds it from a larger menu (e.g., carrier portal). In block 502, the device displays a menu of available applications. The applications may be categorized into folders and may show only those suitable for the SL45I. In block 503, the mobile device selects an application from the menu of those available. In block 504, a short information screen is displayed on the device describing the application, including size and cost. In block 505, the user presses the DOWNLOAD button to initiate OTA download. Note that in this example, while the WAP browser downloads the JAD file, the JAR file is downloaded by the JAM using TCP. In block 505, if there is a billing charge on download, approval will be requested.

Nokia handsets such as the 3410 handle OTA provisioning of J2ME applications in a way very similar to the Siemens SL45i. There is an important difference in that the Siemens SL45i hands the download itself over to the Java Application Manager which downloads the JAR file via TCP/IP whereas the Nokia handsets download the JAR within the WAP browser using a WAP request and then hands the downloaded JAR file over to the JAM. Thus, with a Nokia handset, only one set of Internet settings (those for the WAP browser) is used, whereas with the Siemens handset, separate WAP and Java Internet settings are used.

Additional aspects associated with provisioning registered applications include displaying applications in a form convenient for the user, ensuring compatibility with a range of user devices and communicating between the application provisioning server and the user. These aspects are described further in the following sections.

A. Application Catalogue

The system may provide carriers and portals with access to an extensive catalogue of content from which users may select applications to download. To facilitate browsing for various applications available for download, the facility may facilitate the use of a WAP or similar browser on the user's mobile device. The applications may be presented as a series of pages organized by a hierarchy of categories. An application may be marked with several different categories allowing it to appear in many places in the hierarchy. Each application may have a brochure that describes the application in detail including screenshots, pricing, etc. From the application brochure, the application can be downloaded to the user's mobile device.

Figure 6:
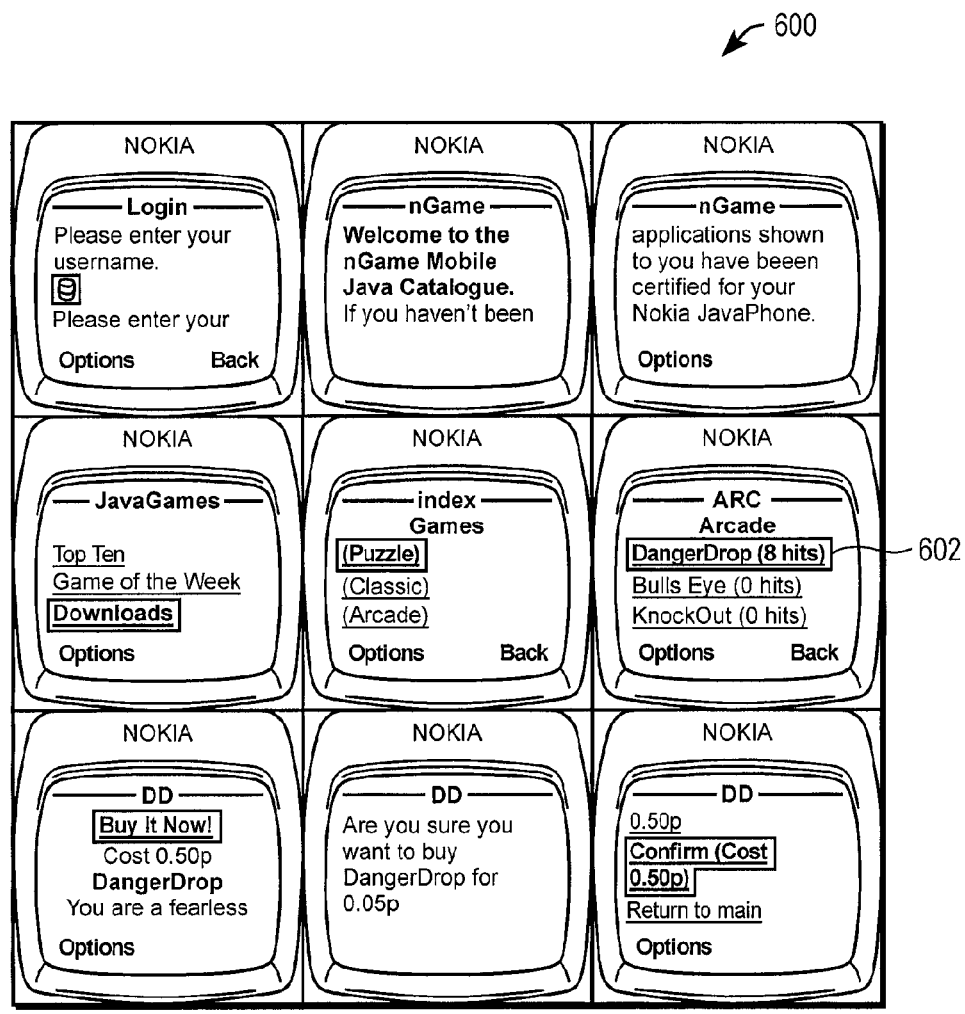
FIG. 6 is a display diagram showing an example of an application catalogue for browsing and choosing registered applications for download.

FIG. 6 is a display diagram showing an example of an application catalogue 600 for browsing and choosing registered applications for download. The application catalogue not only allows the user to easily navigate through and select registered applications compatible with the user's mobile device, but may also function to present the menus and brochures in a fashion that best suits the mobile device's browser. The number of applications displayed on any one page may be limited to fit within the device's deck-size limits.

The application catalogue can provide a variety of details about each registered application. In some embodiments, this information covers three main aspects: the application brochure, the charging policy, and the usage statistics. The application brochure includes information about the application's title, both brief and detailed descriptions about the application, screenshots, developer and supplier information including logos, etc. The charging policy may be described by a set of events (e.g., download, upgrade, highscore, etc.) and the corresponding charges for each event. In some cases, a limited free-trial period can be specified.

Usage statistics may consist of information logs generated by the application provisioning server. Along with usage statistics, these logs can be used generate a wide range of reports giving user feedback into a carrier's purchasing and promotion decisions. Each transaction may be a time-stamped record detailing the user, application and event. Supporting information may also be available in the comprehensive system logs. Typical reports available may include download traffic graphed over time, cumulative over application or supplier. Statistics may also be available as Excel spreadsheets for more sophisticated analysis. An example of a benefit of such reporting includes being able to account to suppliers their share of revenues from downloads. Carriers or application provisioning service providers can choose the level of detail to report to suppliers according to their contractual obligations.

Usage statistics may be accompanied by rating information. The system may provide one or more mechanisms that allow users to rate applications. This can be done after the application terminates where the application is deployed as a registered application. Alternatively, users may rate a registered application when the application is executed online. To facilitate this process, the application provisioning server may request that users rate applications that they previously downloaded the next time that the user browses the catalogue. User ratings can be used to rank applications according to popularity more reliably than simple download frequency (which can lead to lemming-like behavior when everyone follows the first few). The user ratings can also be used to build more sophisticated profiles matched to a user's download history such as "people who liked X also liked Y."

In some embodiments, the application catalogue can present different views according to the territory or language of the user. This capability may be useful for carriers and portals that span multiple territories or in a territory with several languages to support such as English and French in Canada. The application catalogue may offer the carrier or application provisioning service provider considerable editorial control to promote particular applications or particular suppliers.

B. Device Compatibility

Each registered application may have a variety of versions tailored for the range of mobile devices available. The application catalogue may have the ability to record a variety of details about each available mobile device. Carriers and application provisioning service providers can define new mobile devices themselves and record them in a database. The release of new mobile devices may be tracked across a variety of territories so that new records for additional mobile devices may be distributed on a regular basis. The application catalogue records sufficient information to supply the correct version for a user's mobile device. In the case of MIDP, each version may be a JAR (Java Archive Tool) file tagged with the set of mobile devices it is certified for and a version number that allows updates to be correctly deployed to users that have downloaded older versions. For example, the application provisioning server may identify the type of mobile device from the user-agent string passed to it by the mobile device's WAP browser or Java Application Manager. However, this may not always serve to uniquely identify each mobile device, in which case the application provisioning server can ask the user which mobile device they are using on their first visit and record this for subsequent visits. If the user later changes mobile devices, the user may have the opportunity to change their recorded mobile device information.

The application catalogue may, for example, also record a variety of details about the device's Java capabilities, which are used to select good matches for application versions to devices that have not yet been certified by the carrier or application provisioning service provider. Common device capabilities include screen format (width, height and implied aspect ratio); color format (monochrome, greyscale, palette color, RGB color and bits/pixel); input method (touch screen vs. keyboard and what keys available, rocker pad, roller bar, etc.); sound/vibration; maximum JAR size; maximum available memory, etc.

Device capability records may be distributed in XML (Extensible Mark-Up Language), allowing processing by tools other than those supplied by the facility. Such records can be imported into a live catalogue allowing carriers and application provisioning service providers to track the deployment of new mobile devices.

C. Use of SMS in Application Provisioning

While registered applications can be provisioned via the application catalogue, the use of SMS or instant messaging may compliment the overall provisioning process. Although the size of a Java application typically exceeds that which SMS or instant messaging provisioning mechanisms allow (such as ring-tones), the application provisioning server can prompt users with SMS-style notifications of promotional applications, new applications in categories they are interested in or updates of applications they had previously downloaded. The SMS or instant message can include a direct URL to the appropriate version of the application for their mobile device and on many mobile devices the user can select the link inside the SMS message and click on it to immediately begin download without having to navigate the application catalogue.

Since some users see unsolicited SMS as a nuisance (and in some territories there are legal problems with such schemes), the user can opt out of receiving SMS or select which SMS messages they do want to receive. To comply with legal requirements in some territories, the application provisioning server can be configured to make this opt-in by default. Some carriers and application provisioning service providers may manage this through their own portals and user registration process, in which case the application provisioning server will defer to the portal for policy.

Another use of SMS is for revenue-collection whereby a reverse-charged SMS is sent to the user and the content provider takes a share of the SMS charge. They system may provide strategies for presenting these charges to the user.

V. License Management

Figure 7:
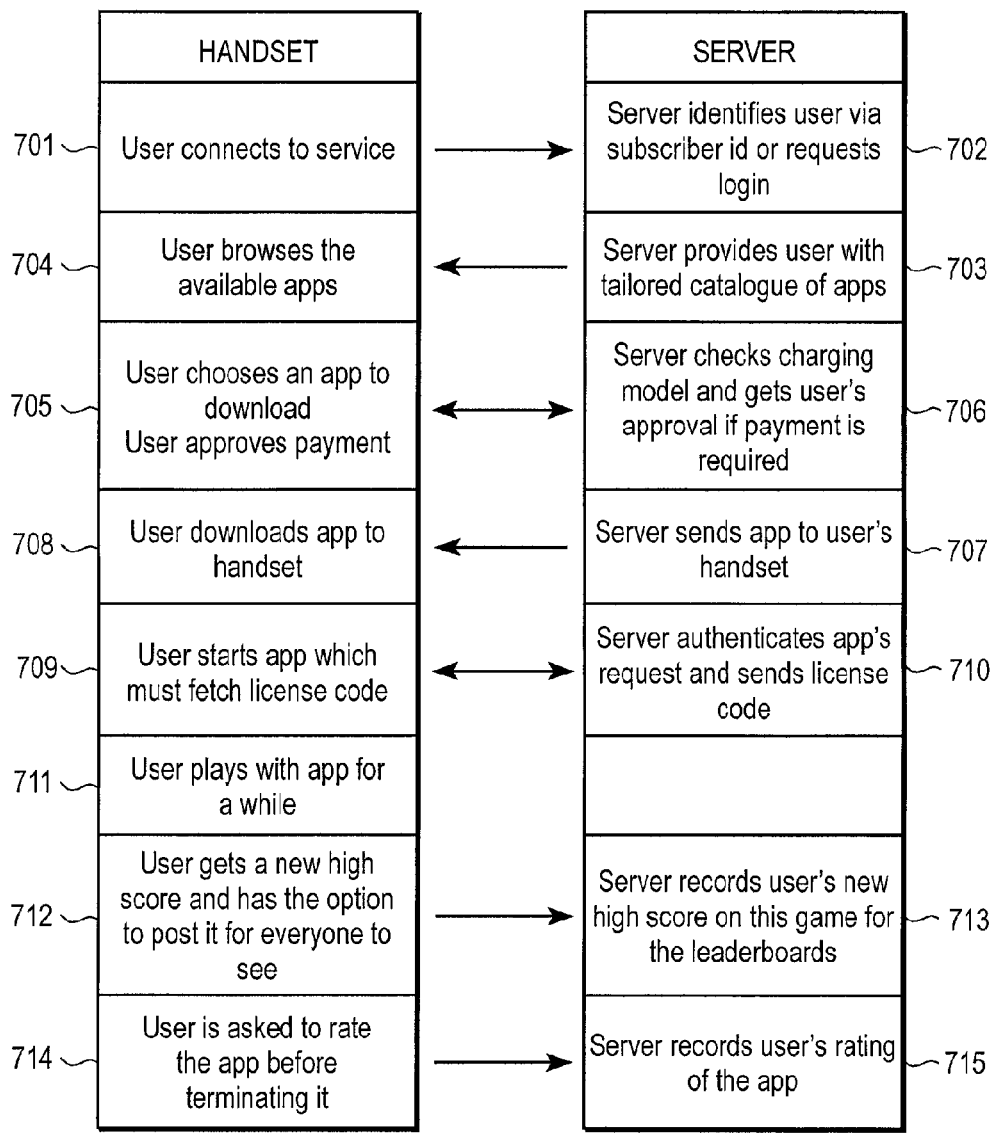
FIG. 7 is communication flow illustrating an example of a dialog between a mobile device and a server for selecting, downloading and licensing a registered application and then subsequently posting a high score and an application rating.

FIG. 7 is communication flow illustrating an example of a dialog between a mobile device and a server for selecting, downloading and licensing a registered application and then subsequently posting a high score and an application rating.

In block 701, the user connects to an application provisioning server in order to view available applications. In block 702 the server identifies the user via a subscriber ID or requests that the user login. In block 703, the server provides the user with a catalogue of applications for browsing. The catalogue may be tailored to the specific user depending on user preferences. In block 704, the user browses the available applications. In block 705, the user selects a registered application to download and approves payment for the selected application, if necessary. In block 706, the Server checks the charging model or licensing scheme. Some examples of licensing schemes are as follows:

Rental—the user pays to use the application for a limited period of time.

Rental subscription—the user can use the application while a subscription is active.

Limited free trial—the user can use the application free for a limited period or number of uses after which a charge must be paid to continue.

Coin-op—the user pays for a fixed number of uses ('coins') after which the coin wallet must be topped up from the server for an additional payment.

Feature charging—this can sit on any of the other charging models as an optional mechanism appropriate for some applications; the user pays to access certain features within the application.

In block 707, the server sends the registered application to the user's mobile device. In block 708, the registered application is downloaded onto the user's mobile device. Once the registered application is successfully downloaded and a licensing scheme is in place, in block 709, the user starts the registered application. In some embodiments, the license or unlock code is first fetched from the server as soon as the registered application is launched, depending on the licensing scheme that is in place. When the registered application starts up, the application manager invokes the registered application's implementation of startApp( ). This checks that it has a valid license by establishing a UDP, TCP, HTTP or other supported protocol connection to the server and transmitting a simple message. The protocol and message format is determined by the server platform but a common interface is presented to the application, the detail being hidden in the specific implementation of the registered application. In block 710, the server authenticates the request for a license or unlock code and sends the license code to the user's device. In some embodiments, the license verification proceeds as follows:

1. Is there an existing license key?
2. If so, the license is verified for the user and application and checked for expiry. If the license key is valid, the application then starts via startRegisteredApp( ).
3. If there is no existing license key or if it has expired, the registered application queries the license server for a cost of obtaining a license.
4. The registered application then asks the user to approve paying to unlock the application. The user at this point may terminate the application without cost. If the license cost is zero (either there is a free trial on or the user has already covered the license fee) this step may be skipped.
5. The registered application then queries the license server for a license key. If a fee is payable, the appropriate billing event is issued by the license server.

This process is seamless as far as the user is concerned; only if the mobile device is temporarily out of signal will the user have to try again. In the case where this process immediately follows, a successful OTA download of the application, it is unlikely that the network connection will have been lost.

In block 711, the user plays with the registered application (e.g., a game application). In block 712, the user gets a new high score and selects to have the score posted by having the registered application send the high score information to the server. In block 713, the server records the received high score and posts it to leaderboards. In block 714, the user receives a request from the server to rate the application and sends the rating information. In block 715, the server records the user's rating information. This information may then be made available via the application catalogue.

In an alternate embodiment, the registered application may be responsible for the license management via the mobile device and carrier/application provisioning service provider (as opposed to connecting to the application provisioning server to get an unlock code). In one implementation, an algorithm records the license in a RecordStore that each application has available. In the case of a registered MIDlet, because the J2ME Specification may require the RecordStore to be secure, the registered application may be protected against copying. In this way, various algorithms associated with the registered application may be used to perform license management functions, such as checking a current date against an expiration date that is supplied at the time the application is initially download or contacting a known server to acquire a license key. With respect to the latter, this key could be acquired every time the application is started or stored in the local RecordStore, where it is more likely that it will not be copied.

Along with facilitating license management functions, the registered application may be used to send data to the application provisioning server (e.g. high scores, feedback, user ratings, etc.) For example, the registered application may make a UDP, TCP, HTTP or other supported protocol connection to the application provisioning server and transmit a simple message such as "RATING, thisgame, fred, 7" or "HIGHSCORE, thisgame, fred, 10020" to the server. This message may then be stored for later processing such as when the "Top Ten High Scores" for a particular game is determined. The protocol and message format may be determined by the server platform, but a common interface may be presented to the application, the detail being hidden in the specific implementation of the registered application.

The registered application may support the addition of developer improvements to an application that has already been downloaded by a user. For example, when the registered application contacts the application provisioning server it can identify to the server the revision number of the application. The server can inform the registered application if there is a newer version of the application that the user can then be directed to download if desired.

As well as eliminating a cycle of updates with developers, the registered application may also provide some other standardization such as elements of user the application's user interface (e.g., how to present error states or game intro sequences). For example, some carriers choose to impose "Style Guides" on applications distributed through them. These "Style Guides" might specify the time spent presenting logos to the user and include additional requirements on branding. To further illustrate, a sequence of screens may display a series of messages such as "powered by XYZ Carrier," "nGame presents," "a Studio game." The registered application may provide facilities for automating such sequences whereby the developer simply identifies their logo screen, the publisher theirs and the carrier theirs; the registered application may present the appropriately timed slideshow in accordance with the Style Guide.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. Similarly systems consisting of components other than those described here may be utilized to implement the invention. The teachings of the invention provided herein can be applied to other systems. These and other changes can be made to the invention in light of the detailed description.

It will be further appreciated by those skilled in the art that the above-described facility may be straightforwardly adapted or extended in various ways. For example, the application provisioning and management techniques may be applied to manage applications outside the realm of mobile devices. While the foregoing description makes reference to preferred embodiments, the scope of the invention is defined solely by the claims that follow and the elements recited therein.

We claim:

1. A method for provisioning registered applications, the registered applications to be downloaded to mobile devices from an application provisioning server communicating with the mobile devices, the method comprising:

providing an application catalogue containing the registered applications;

receiving a first request, for downloading a selected application of the registered applications, wherein the first request includes information about a particular mobile device that is to receive the selected application;

determining, based on the received information, a download scenario appropriate for the particular mobile device;

sending the selected application for deliver to the particular mobile device using the determined download scenario, wherein the selected application sent to the mobile device is adapted for the initial execution by the mobile device but includes a portion that cannot be executed by the mobile device absent a verification;

receiving a second request, for the verification; and conditioned upon authenticating the second request, sending the verification for delivery to the particular mobile device.

2. The method of claim 1, wherein the sending of the selected application includes sending a license key for storage on the mobile device and wherein sending the verification includes sending a license key verification to the particular mobile device sufficient to authorize execution of the portion by the particular mobile device.

3. The method of claim 1, wherein the determining includes a selection of a charging scheme based upon the received information from a set of alternate charging schemes.

4. The method of claim 1, wherein the selected application is offered on a limited free trial, and wherein the method further comprises, upon receiving the second request, processing the second request to selectively generate a code to represent the verification, the code adapted to permit extended use of the selected application.

5. The method of claim 1, wherein the selected application is offered on a feature charging basis.

6. The method of claim 1, wherein providing the application catalogue includes providing a view that is customized depending on at least one of the territory or language of a user of the particular mobile device.

7. The method of claim 1, wherein the selected application is bound within an application package including licensing information.

8. A system for provisioning registered applications, the registered applications adapted for downloaded to mobile devices from an application provisioning server communicating with the mobile devices, the system comprising at least one processor and a non-transitory computer readable medium comprising instructions that when executed by the at least one processor causes the at least one processor to perform the steps of:

providing an application catalogue containing the registered applications; receiving a first request, for downloading a selected application of the registered applications, wherein the first request includes information about a particular mobile device that is to receive the selected application;

determining, based on the received information, a download scenario appropriate for the particular mobile device;

sending the selected application for delivery to the particular mobile device using the determined download scenario, wherein the selected application sent to the mobile device is adapted for initial execution by the mobile device but includes a portion that cannot be executed by the mobile device absent a verification;

receiving a second request, for the verification; and conditioned upon authenticating the second request, sending the verification for delivery to the particular mobile device.

9. The system of claim 8, wherein the instructions for sending of the selected registered application includes instructions for sending a license key for storage on the mobile device, and wherein the instructions for sending of the verification includes instructions for sending a license key verification to the particular device.

10. The system of claim 9, further comprising instructions for, responsive to the information about the particular mobile device, determining whether a license associated with the license key has expired, and querying a user of the particular mobile device for authorization to extend the license for-fee.

11. The system of claim 8, wherein the insurrections for sending the selected application for download to the particular mobile device include instructions for sending a lightweight version of the selected application and wherein the system further comprises instructions for, conditioned upon authenticating the second request, upgrading the selected application.

12. The system of claim 8, wherein the selected application is offered on a feature charging basis, and wherein the system further comprises instructions for determining a newly requested feature requested by the mobile device and for charging an account associated with the user accessing certain features within the selected application sent to the particular mobile device.

13. The system of claim 8, wherein the instructions for providing the application catalogue comprises instructions for providing information associated with usage statistics for each of the at least one registered applications.

14. The system of claim 8, wherein the selected application is bound within an application package including licensing information.

15. The system of claim 8, wherein the instructions for determining the download scenario comprise a Java Application Manager.

16. A non-transitory computer-readable medium for provisioning registered applications, wherein the registered applications are to be downloaded to mobile devices from an application provisioning server communicating with the mobile devices, the non-transitory computer readable medium comprising instructions that when executed by a processor causes the processor to perform the steps of:

providing an application catalogue containing the registered applications; receiving a first request, for downloading a selected application of the registered applications, wherein the request includes information about a particular mobile device that is to receive the selected application;

determining, based on the received information, a download scenario appropriate for the particular mobile device;

sending the selected application for delivery to the particular mobile device using the determined download scenario, wherein the selected application sent to the mobile device is adapted for initial execution by the mobile device but includes a portion that cannot be executed by the mobile device absent a verification;

receiving a second request, for the verification; and conditioned upon authenticating the second request, sending the verification for delivery to the particular mobile device.

17. The method of claim 1, wherein the method further comprises, in response to receiving the information about the particular mobile device that is to receive the selected application, using the application provisioning server to take control of the particular mobile device including performing at least one of license verification or digital rights management before passing control of execution of the selected application back to the particular mobile device.

18. The method of claim 2, wherein the sending of a license key verification to the particular mobile device sufficient to authorize execution of the portion by the particular mobile device includes binding the selected application to a hardware identification of the mobile device.

19. The method of claim 2, wherein the sending of a license key verification to the particular mobile device sufficient to authorize execution of the portion by the particular mobile device includes sending an unlock or license code to the particular mobile device.

* * * * *